United States Patent
Takasuka et al.

(10) Patent No.: US 10,061,030 B2
(45) Date of Patent: Aug. 28, 2018

(54) IN-VEHICLE APPARATUS PERFORMING AN OPERATION BASED ON A DISTANCE MEASURED, AND IN-VEHICLE SYSTEM INCLUDING THE IN-VEHICLE APPARATUS

(71) Applicant: DENSO CORPORATION, Kariya, Aichi-pref. (JP)

(72) Inventors: Naohito Takasuka, Nishio (JP); Junichiro Funabashi, Nagoya (JP)

(73) Assignee: DENSO CORPORATION, Kariya, Aichi-pref., (KR)

( * ) Notice: Subject to any disclaimer, the term of this patent is extended or adjusted under 35 U.S.C. 154(b) by 284 days.

(21) Appl. No.: 14/844,031

(22) Filed: Sep. 3, 2015

(65) Prior Publication Data
US 2016/0070000 A1 Mar. 10, 2016

(30) Foreign Application Priority Data
Sep. 4, 2014 (JP) .................. 2014-180406

(51) Int. Cl.
*G01C 3/08* (2006.01)
*G01S 17/93* (2006.01)
(Continued)

(52) U.S. Cl.
CPC ............ *G01S 17/936* (2013.01); *G01S 7/003* (2013.01); *G01S 7/4972* (2013.01);
(Continued)

(58) Field of Classification Search
CPC combination set(s) only.
See application file for complete search history.

(56) References Cited

U.S. PATENT DOCUMENTS

| 6,122,040 A * | 9/2000 | Arita | B60T 7/22 |
| | | | 180/169 |
| 8,736,820 B2 * | 5/2014 | Choe | G05D 1/024 |
| | | | 356/3.01 |

(Continued)

FOREIGN PATENT DOCUMENTS

| JP | 2005299844 A | 10/2005 |
| JP | 2007008298 A | 1/2007 |

(Continued)

*Primary Examiner* — Samantha K Abraham
(74) *Attorney, Agent, or Firm* — Harness, Dickey & Pierce, P.L.C.

(57) ABSTRACT

An in-vehicle apparatus installed in a first vehicle. The in-vehicle apparatus includes a first distance sensor measuring a distance to an object based on time to receive a reflection wave of an electro-magnetic transmission wave from the object after a transmission of the electro-magnetic transmission wave, with the first distance sensor being an electro-magnetic wave sensor. The in-vehicle apparatus also includes an inclination angle sensor that senses a first vehicle inclination angle representative of an inclination angle of the first vehicle that includes the first distance sensor, a radio communicator that receives a second vehicle inclination angle transmitted from a second vehicle that leads the first vehicle, an angle difference calculator that calculates an angle difference between the first vehicle inclination angle and the second vehicle inclination angle, and a processor that performs a preset operation based on the distance measured by the first distance sensor.

8 Claims, 8 Drawing Sheets

(51) Int. Cl.
  *G01S 17/87*   (2006.01)
  *G01S 17/02*   (2006.01)
  *G01S 7/00*    (2006.01)
  *G01S 7/497*   (2006.01)
  G01S 17/10     (2006.01)
  G01S 13/93     (2006.01)
  G01S 17/42     (2006.01)
  G01S 17/58     (2006.01)

(52) U.S. Cl.
  CPC ............ G01S 17/023 (2013.01); G01S 17/87 (2013.01); *G01S 17/10* (2013.01); *G01S 17/42* (2013.01); *G01S 17/58* (2013.01); *G01S 2013/936* (2013.01)

(56) References Cited

U.S. PATENT DOCUMENTS

| | | |
|---|---|---|
| 2007/0005218 A1 | 1/2007 | Ueyama |
| 2009/0135047 A1 | 5/2009 | Matsuura et al. |
| 2012/0330527 A1 | 12/2012 | Kumabe et al. |

FOREIGN PATENT DOCUMENTS

| | | |
|---|---|---|
| JP | 2009035245 A | 2/2009 |
| JP | 2009115628 A | 5/2009 |
| JP | 2012027605 A | 2/2012 |
| JP | 2013-008302 | 1/2013 |
| JP | 2014095562 A | 5/2014 |

\* cited by examiner

IN-VEHICLE APPARATUS PERFORMING AN OPERATION BASED ON A DISTANCE MEASURED, AND IN-VEHICLE SYSTEM INCLUDING THE IN-VEHICLE APPARATUS

CROSS REFERENCE TO RELATED APPLICATION

The present application is based on and claims the benefit of priority of Japanese Patent Application No. 2014-180406, filed on Sep. 4, 2014, the disclosure of which is incorporated herein by reference.

TECHNICAL FIELD

The present disclosure generally relates to an in-vehicle apparatus installed in a vehicle, for performing an operation based on a distance measured by an electro-magnetic wave type distance sensor in the vehicle, and to an in-vehicle system having such an in-vehicle apparatus.

BACKGROUND INFORMATION

A vehicle may be equipped with a distance measurement device that measures an inter-vehicle distance between a subject vehicle and a lead vehicle in front of it. Such a distance measurement device may emit or transmit, a laser beam toward a front field of the subject vehicle and receives a reflection of the emitted beam reflected by the lead vehicle. The device, a so-called laser radar or an optical distance measurement sensor, disclosed in a patent document, Japanese Patent Laid-Open No. 2013-8302 (Patent document 1) is used to detect an inter-vehicle distance. The laser radar or the optical distance measurement sensor has a high measurement accuracy.

The optical distance measurement sensor uses a light beam for the distance measurement, and the light beam has a high straight-transmission stability of running straight, or traveling forward. Therefore, in situations where the lead vehicle climbs uphill while the subject vehicle is still traveling a flat part of the road, or where the lead vehicle is already traveling the flat part of the road while the subject vehicle is still traveling downhill, the laser beam may be reflected by the road surface instead of being reflected by the lead vehicle. That is, the road surface may erroneously be detected as the lead vehicle by the laser radar in the above-described situations.

Further, the electric wave has a high straight-transmission stability at high frequencies. Therefore, the electro-magnetic distance measurement sensor may also erroneously detect the road surface as the lead vehicle, when the detection wave is in high frequencies. Even with the low frequency wave, the road surface may still be erroneously detected as the lead vehicle, with the possibility of such error detection decreasing just a little bit down from the high frequency waves.

The erroneous detection of the road surface as the lead vehicle leads to an erroneous control of an automatic function based on the inter-vehicle distance to the lead vehicle, such as an automatic braking, an automatic steering and the like.

SUMMARY

It is an object of the present disclosure to provide an in-vehicle apparatus and an in-vehicle system which are capable of preventing an erroneous vehicle control based on an erroneous detection of the road surface as the lead vehicle.

The independent claims describe a feature or features of the present disclosure achieving the above-described goal. The dependent claims further describe advantageous aspects of the disclosure. The numerals intend to show exemplary relationships between the claim terms and the concrete parts in the embodiment, in a non-limiting manner.

In an aspect of the present disclosure, an in-vehicle apparatus is installed in a first vehicle. The in-vehicle apparatus includes a first distance sensor that measures a distance to an object based on time to receive a reflection wave of an electro-magnetic transmission wave from the object after a transmission of the electro-magnetic transmission wave, with the first distance sensor being an electro-magnetic wave sensor. The in-vehicle apparatus also includes an inclination angle sensor that senses a first vehicle inclination angle representative of an inclination angle of the first vehicle that includes the first distance sensor, a radio communicator that receives a second vehicle inclination angle transmitted from a second vehicle that leads the first vehicle, an angle difference calculator that calculates an angle difference between the first vehicle inclination angle and the second vehicle inclination angle, and a processor that performs a preset operation based on the distance measured by the first distance sensor. The processor operates in an inclination mode based on a calculation of the angle difference calculator indicating that the angle difference is greater than a preset threshold. Also, the operation of the processor in the inclination mode controls a vehicle based on the distance measured by the first distance sensor less performable in comparison to a flat mode which is put in effect when the angle difference is smaller than the preset threshold.

Further, in another aspect of the present disclosure, the in-vehicle system includes an in-vehicle apparatus installed in a first vehicle. The apparatus includes an electro-magnetic wave sensor that measures a distance to an object based on time to receive a reflection wave of an electro-magnetic transmission wave from the object after a transmission of the electro-magnetic transmission wave, an inclination angle sensor that senses a first vehicle inclination angle representative of an inclination angle of the first vehicle that includes the electro-magnetic wave sensor, and a radio communicator that receives a second vehicle inclination angle transmitted from a second vehicle that leads the first vehicle. The apparatus also includes an angle difference calculator that calculates an angle difference between the first vehicle inclination angle and the second vehicle inclination angle, and a processor that performs a preset operation based on the distance measured by the electro-magnetic wave sensor. The processor operates in an inclination mode based on a calculation of the angle difference calculator indicating that the angle difference is greater than a preset threshold. Also, the operation of the processor in the inclination mode makes a vehicle control based on the distance measured by the electro-magnetic wave sensor less performable in comparison to a flat mode which is put in effect when the angle difference is smaller than the preset threshold.

When the second vehicle is climbing uphill on a slope while the first vehicle is still on a flat part of the road before the slope, or when the second vehicle has already passed a downhill slope to enter a flat part of the road while the first vehicle is still traveling on the down slope, the difference between the first vehicle inclination angle and the second vehicle inclination angle is large. Therefore, in the present disclosure, an angle difference between two inclination angles is calculated, and when the angle difference is greater than the preset threshold of difference, the processor operates in the inclination mode. In the inclination mode, the vehicle control is less likely to be performed than in the flat mode, based on the same distance measurement of the electro-magnetic distance measurement sensor. Therefore, the operation scheme of the present disclosure prevents the vehicle control to be erroneously performed based on the erroneous detection of the road surface as the lead vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Hereafter, the embodiments of the present disclosure is described based on the drawings.

(Mechanical Configuration)

Figure 1:
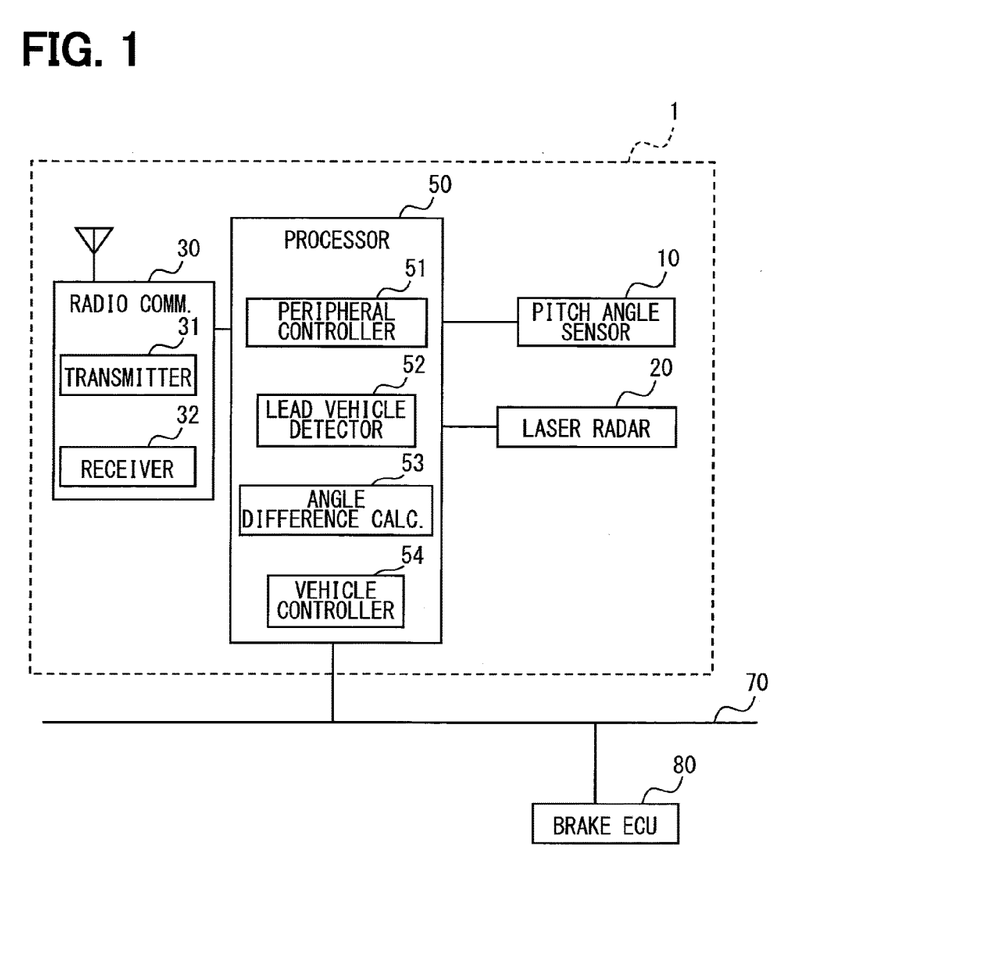
FIG. 1 is a block diagram of an in-vehicle system in a first embodiment of the present disclosure.
Figure 3:
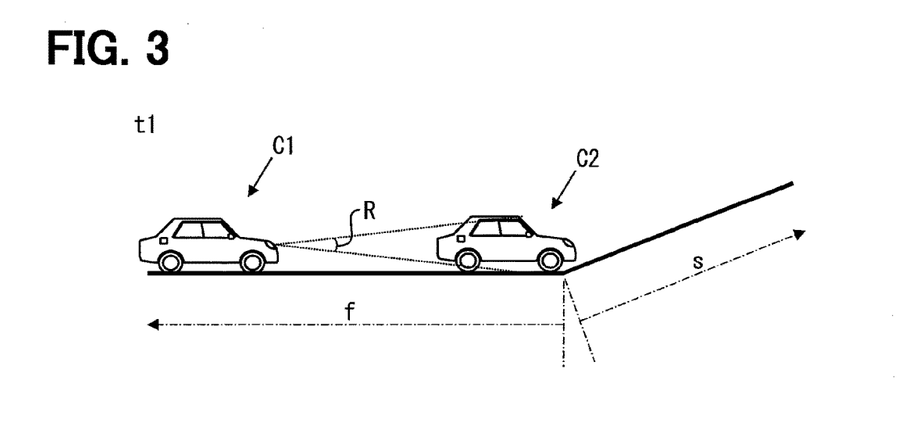
FIG. 3 is an illustration of effects of the first embodiment of the present disclosure.
Figure 4:
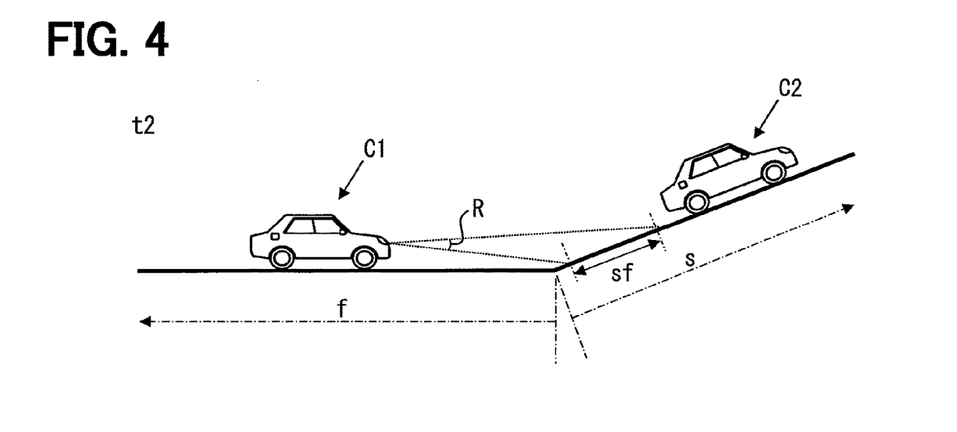
FIG. 4 is an illustration of the effects of the first embodiment of the present disclosure.
Figure 5:
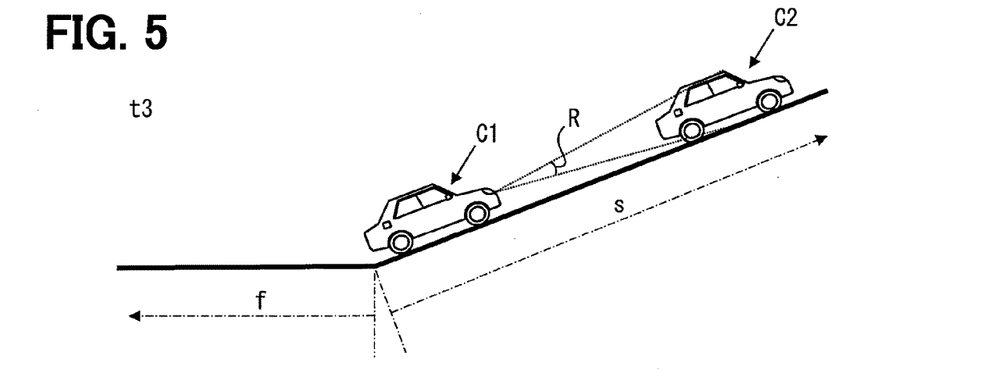
FIG. 5 is an illustration of the effects of the first embodiment of the present disclosure.

An in-vehicle system 1 of the first embodiment in FIG. 1 is provided with a pitch angle sensor 10, a laser radar 20, a radio communicator 30, and a processor 50, and is disposed in each of two or more vehicles, e.g., in a first vehicle C1 and a second vehicle C2, respectively, as shown in FIGS. 3-5.

The pitch angle sensor 10 corresponds with an inclination angle sensor and detects a pitch angle, or an inclination angle along a travel direction, of a vehicle (e.g., of an own vehicle) in which the in-vehicle system 1 is disposed. The pitch angle sensor 10 is an acceleration sensor having two or three axes, or a gyro sensor, for example.

The laser radar 20 corresponds to a first distance sensor, and is disposed in a front end part of the own vehicle. The laser radar 20 irradiates with a pulse form laser beam (i.e., an irradiated light) towards a front field of the own vehicle. The irradiated light scans the front field within a present scan angle range. The scan angle range is a two-dimensional range, for example, and a vertical range of irradiated light is within 10 degrees or less.

The laser radar 20 calculates a distance to an object in the field by receiving a reflected light from the object and by multiplying time between the irradiation and the reception of the light with a light speed. The vehicle detecting range of the laser radar 20 vary between 100 to several hundreds of meters. The calculation of the time difference or the calculation of the distance may be performed by a processor 50. The laser radar 20 corresponds to an electro-magnetic wave sensor, and the irradiated light corresponds to the transmission wave, and the reflected light corresponds to the reflected wave.

The radio communicator 30 is a communications device that is capable of performing a vehicle-to-vehicle communication, and has a transmitter 31 and a receiver 32. The radio communicator 30 uses a frequency band of 5.8-5.9 GHz or 700 MHz, for example, and the communication range may be hundreds of meters.

The processor 50 corresponds to an in-vehicle apparatus. The processor 50 is connected with the pitch angle sensor 10, the laser radar 20, and the radio communicator 30. The processor 50 is also connected with an in-vehicle Local Area Network (LAN) 70, and the processor 50 obtains a vehicle speed of the own vehicle, etc. via the in-vehicle LAN 70.

The processor 50 is a computer provided with a Central Processing Unit (CPU), Read-Only Memory (ROM), Random-Access Memory (RAM), etc. The processor 50 functions as a peripheral controller 51, a lead vehicle detector 52, an angle difference calculator 53, and a vehicle controller 54 when CPU executes a program memorized in ROM with a help of a memory function of RAM. One or more Integrated Circuits (ICs) (i.e., hardware) may be used to provide the functions of the processor 50 described above.

(Function of the Processor 50)

The peripheral controller 51 controls the laser radar 20, and irradiates the irradiated light from the laser radar 20. Further, an angle of inclination obtained from the pitch angle sensor 10, a vehicle speed obtained via the in-vehicle LAN 70, and a vehicle Identification (ID) memorized in a preset memory are transmitted to an outside device from the transmitter 31 of the radio communicator 30. The vehicle ID may be substituted with a device ID of a device installed in the vehicle, such as an ID of the radio communicator 30, or the like. The information transmitted from the transmitter 31, which includes the inclination angle, the vehicle speed, and the vehicle ID, is designated hereafter as transmitting vehicle information of a transmitting vehicle.

The lead vehicle detector 52 detects (i.e., finds and identifies) a lead vehicle. The lead vehicle may be a vehicle traveling in the same lane of the road in front of the own vehicle. When many other vehicles are traveling around the own vehicle and those other vehicles are respectively equipped with the in-vehicle system 1, the transmitting vehicle information may be transmitted from those many other vehicles.

Thus, the lead vehicle detector 52 determines whether (i) the speed in the transmitting vehicle information received by the receiver 32 of the radio communicator 30 and (ii) the speed which is calculated based on the change of the distance measured by the laser radar 20 with the irradiated light toward the front field match with each other. When the two speeds are matching, the transmitting vehicle that has transmitted the transmitting vehicle information including the matching-determined vehicle speed is determined as the lead vehicle. Once the lead vehicle is specifically identified, the lead vehicle may then be identified based on the vehicle ID which is received by the radio communicator 30.

The angle difference calculator 53 calculates an inclination angle difference, which is a difference between two inclination angles (i.e., (i) an inclination angle of the own vehicle obtained from the pitch angle sensor 10 disposed in the own vehicle, and (ii) an inclination angle contained in the transmitting vehicle information that is transmitted from the lead vehicle), and is identified by the lead vehicle detector 52 and received by the receiver 32 of the radio communicator 30 in the own vehicle. The inclination angle contained in the transmitting vehicle information transmitted from the lead vehicle and received by the receiver 32 of the radio communicator 30 corresponds to a second vehicle inclination angle.

The vehicle controller 54 performs a publicly-known automatic brake control based on the inter-vehicle distance to the lead vehicle and the vehicle speed of the own vehicle. For example, when the inter-vehicle distance to the lead vehicle is shorter than a braking distance of the own vehicle which is determined based on the vehicle speed of the own vehicle, the start of the automatic brake is instructed to a brake Electronic Control Unit (ECU) 80 via the in-vehicle LAN 70. In such manner, the own vehicle automatically starts to slow down. The automatic brake control corresponds to a preset operation.

Figure 2:
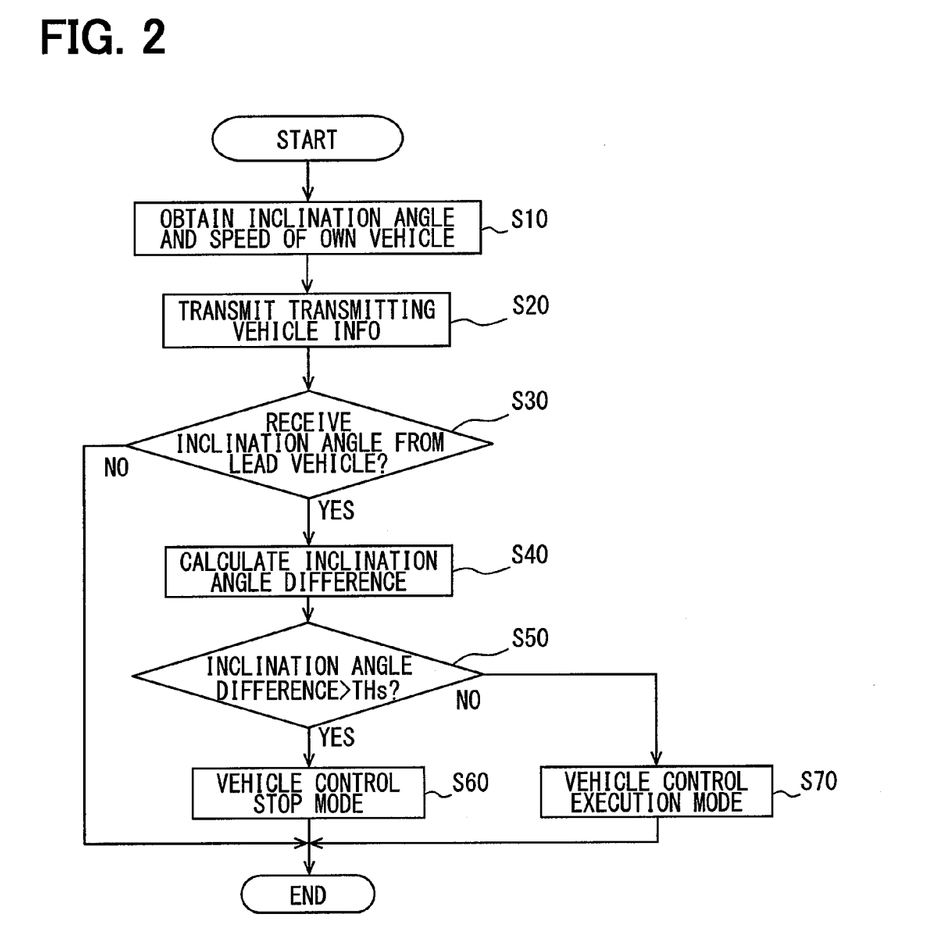
FIG. 2 is a flowchart of a process regarding a peripheral controller, an angle difference calculator, and a vehicle controller in FIG. 1.

FIG. 2 shows a process performed by the peripheral controller 51, the angle difference calculator 53, and the vehicle controller 54, in a flowchart. When a predetermined execution condition is satisfied, the process shown in FIG. 2 is repeatedly executed. The execution condition may be, for example, a switch ON of an ignition switch.

The peripheral controller 51 performs Steps S10 and S20 of the flowchart in FIG. 2, the angle difference calculator 53 performs Steps S30 and S40 of the flowchart, and the vehicle controller 54 performs Steps S50-S70 thereof.

In Step S10, the inclination angle and the vehicle speed of the own vehicle are obtained.

In Step S20, the vehicle ID is added to the inclination angle and vehicle speed that are obtained in Step S10, and the transmitting vehicle information is generated from them, and the transmitting vehicle information is transmitted from the transmitter 31 of the radio communicator 30.

According to the present embodiment, the transmitting vehicle information is transmitted by the broadcasting method, (i.e., without specifying the receiving party). However, the transmitting vehicle information may be transmitted by the unicast method, which specifies a following vehicle following the own vehicle as a receiving party.

In Step S30, it is determined whether the inclination angle is received from the lead vehicle. Since the inclination angle is contained in the transmitting vehicle information, in Step S30, it is, in substance, determined whether the transmitting vehicle information is received from the lead vehicle. If this determination is YES, the process proceeds to Step S40.

In Step S40, the inclination angle difference is calculated by subtracting either one of the inclination angle of the own vehicle obtained in Step S10 and the inclination angle of the lead vehicle determined to have been received in Step S30.

Then, in Step S50, it is determined whether the inclination angle difference calculated in Step S40 is larger than an inclination angle determination threshold THs set up in advance. If this determination is NO (i.e., if the inclination angle difference is equal to or smaller than the inclination angle determination threshold THs), the process proceeds to Step S70, and the processor 50 operates in a vehicle control execution mode, which corresponds to a flat mode. The vehicle control in the present embodiment is the automatic brake control, and the vehicle control execution mode is a mode in which the automatic brake control is performed when a predetermined automatic brake execution condition is satisfied.

On the other hand, when the determination of Step S50 of YES, (i.e., the inclination angle difference is larger than the inclination angle determination threshold THs), the process proceeds to Step S60, and the processor 50 operates in a vehicle control stop mode, which corresponds to an inclination mode. The vehicle control stop mode is a mode in which, regardless of whether the automatic brake execution condition is satisfied, the automatic brake control is not performed.

After performing Steps S60 and S70 and determining an operation mode, the process of FIG. 2 is finished. The vehicle controller 54 stops the automatic brake control when Step S70 is performed, and performs the automatic brake control when Step S60 is performed.

If determination of Step S30 is NO, the process of FIG. 2 is finished. In this case, whether to perform or stop the automatic brake control is determined according to a mode set up at the time of NO determination in Step S30. When the process of FIG. 2 is finished, the process of FIG. 2 will be performed from the beginning after a lapse of preset time.

(Effect of the First Embodiment)

The effect by performing the process of FIG. 2 is described with reference to FIGS. 3-5.

Both of the first vehicle C1 and the second vehicle C2 shown in FIGS. 3-5 are assumed to have the in-vehicle system 1 of the present embodiment disposed therein, and are assumed to be traveling in the same lane. In the following description, the first vehicle C1 is the own vehicle mentioned above, and the second vehicle C2 is the lead vehicle.

At time t1, which is shown in FIG. 3, both of the first vehicle C1 and the second vehicle C2 travel in a flat section f. Therefore, at time t1, the inclination angle difference is small, and the determination in Step S50 of FIG. 2 is NO. Therefore, the vehicle control execution mode is put in effect.

At time t2, which is shown in FIG. 4, although the first vehicle C1 is still traveling in the flat section f, the second vehicle C2 is already traveling in a slope section s. The inclination angle of the slope section s is assumed to be larger than the inclination angle determination threshold THs. Therefore, as shown in FIG. 4, the second vehicle C2 goes out of a vertical scan angle range R of the laser radar 20 that is disposed on the first vehicle C1, after a certain time from an entrance of the second vehicle C2 into the slope section s.

As a result, the irradiated light is reflected by a front region sf of a road surface of the slope section s. The front region sf may be a region of the slope section s in front of the first vehicle C1 positioned in the flat section f, (i.e., a region of the slope section s within the same height as the first vehicle C1).

When the irradiated light reflects on the front region sf of the road surface of the slope section s, the front region sf may possibly be mis-detected as the lead vehicle, and the automatic brake control may be performed.

However, in the present embodiment, when the inclination angle difference is larger than the inclination angle determination threshold THs (S50:YES), the vehicle control stop mode comes into effect (S60).

Therefore, even in a situation in which the irradiated light is reflected by the road surface, the slowdown of the own vehicle based on a mis-detection of the road surface as the lead vehicle is prevented.

At time t3, which is shown in FIG. 5, the first vehicle C1 comes into the slope section s. Therefore, a rear end of the second vehicle C2 reflects the irradiated light from the first vehicle C1, and the inclination angle difference becomes small again. Thus, the vehicle control execution mode comes into effect, and the automatic brake control is resumed.

Second Embodiment

Next, the second embodiment is described.

In the description below regarding the second embodiment, like numerals indicate like parts in the preceding embodiment. Further, when a configuration is partially described, the rest of the configuration (i.e., a non-described part) may be borrowed from the one in the preceding embodiment.

According to the second embodiment, the process performed by the processor 50 is different from the first embodiment.

Figure 6:
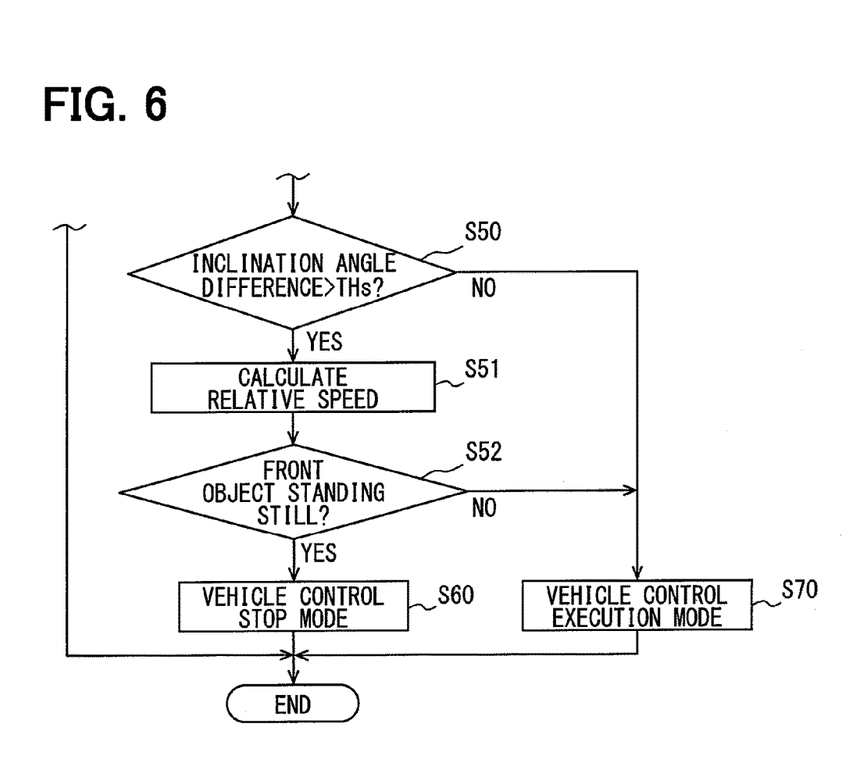
FIG. 6 is a flowchart partially replacing the flowchart in FIG. 2 in a second embodiment of the present disclosure.

According to the second embodiment, the process performed by the processor 50, which is shown in FIG. 2 in the first embodiment, is partially replaced with the process shown in FIG. 6.

In FIG. 6, the same part (i.e., Steps) as shown in FIG. 2 is omitted. As for the process shown in FIG. 6, Steps S51 and S52 are added to the process of FIG. 2, and the vehicle controller 54 performs Steps S51 and S52.

When determination of Step S50 is YES, Step S51 is performed. In Step S51, a relative velocity with the lead vehicle is calculated. The relative velocity is calculated based on the change of the distance measured by the laser radar 20 per unit time, for example.

Then, in Step S52, it is determined whether a front object stops (i.e., is standing still or stationary) at the same position. Whether the front object stops is determined based on whether the relative velocity calculated in Step S51 is steeply decreasing even when the own vehicle speed is not steeply decelerating.

Therefore, in case that the brake of the own vehicle is not in operation, when the absolute value of the change rate in the relative velocity calculated in Step S51 is greater than a predetermined determination threshold, it is determined that the front object stops. In this case, whether the brake of the own vehicle is in operation is determined by obtaining a brake signal via the in-vehicle LAN 70.

Alternatively, when an absolute value of difference between the relative velocity calculated in Step S51 and the vehicle speed of the own vehicle is smaller than a preset determination threshold, which is near 0, it may also be determined that the front object stops.

If the object to which the laser radar 20 measured a distance is the road surface, it should be determined that the front object stops. Therefore, when it is determined that the front object is not in a stop state, even when the inclination angle difference is larger than the inclination angle determination threshold THs, the object to which the laser radar 20 measured a distance is considered as a lead vehicle. Therefore, when it is determined that the front object is not in a stop state (S52:NO), the process proceeds to Step S70, and the vehicle control execution mode comes into effect. When it is determined that the front object is in a stop state (S52:YES), the process proceeds to Step S60, and the vehicle control stop mode comes into effect.

(Effect of the Second Embodiment)

According to the second embodiment, even when the inclination angle difference is larger than the inclination angle determination threshold THs (S50:YES), when it is determined that the front object is not in a stop state (S52:NO), the vehicle control execution mode is put into effect (S70). Therefore, erroneous setting of the vehicle control stop mode into effect while the distance to the lead vehicle is being measured is prevented.

Third Embodiment

The process performed by the processor 50 in the third embodiment is also different from the one in the first embodiment.

Figure 7:
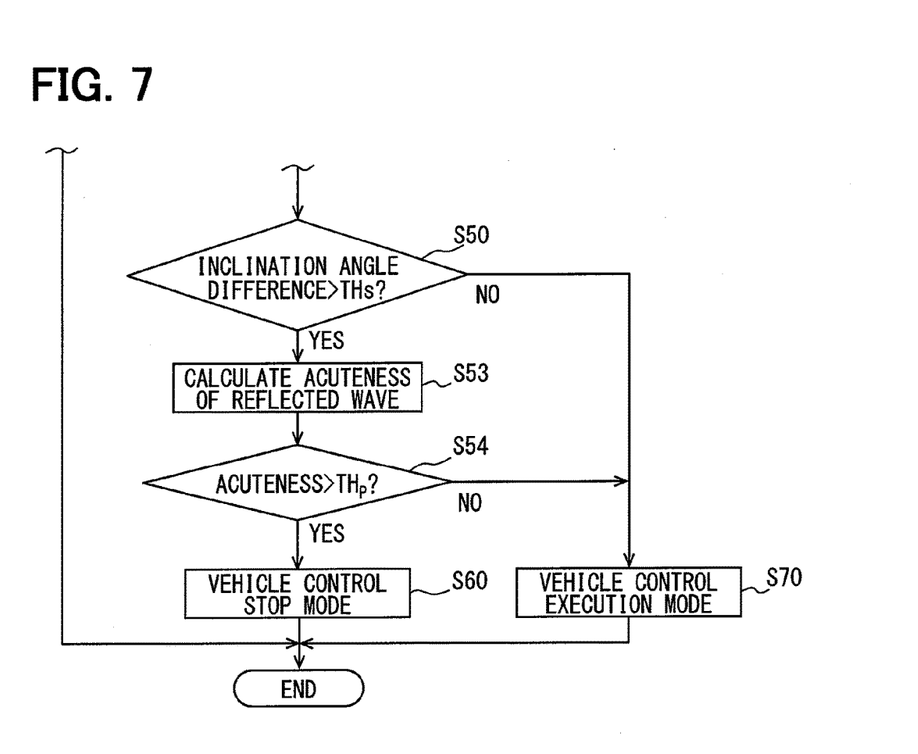
FIG. 7 is a flowchart partially replacing the flowchart in FIG. 2 in a third embodiment of the present disclosure.

According to the second embodiment, the process performed by the processor 50, which is shown in FIG. 2 in the first embodiment, is partially replaced with the process shown in FIG. 7.

In FIG. 7, the same part, i.e., Steps, as FIG. 2 is omitted. As for the process shown in FIG. 7, Steps S53 and S54 are added to the process of FIG. 2, and the vehicle controller 54 performs Steps S53 and S54.

Further, in the third embodiment, the laser radar 20 is a radar that is capable of determining a wave form of the reflected wave, that is, a radar equipped with an Analog-to-Digital (A/D) converter.

In the first and second embodiments mentioned above, the laser radar 20 may be the one described above, or the other one that is capable of detecting that the intensity of the reflection beam is exceeding a threshold by using a comparator.

Figure 8:
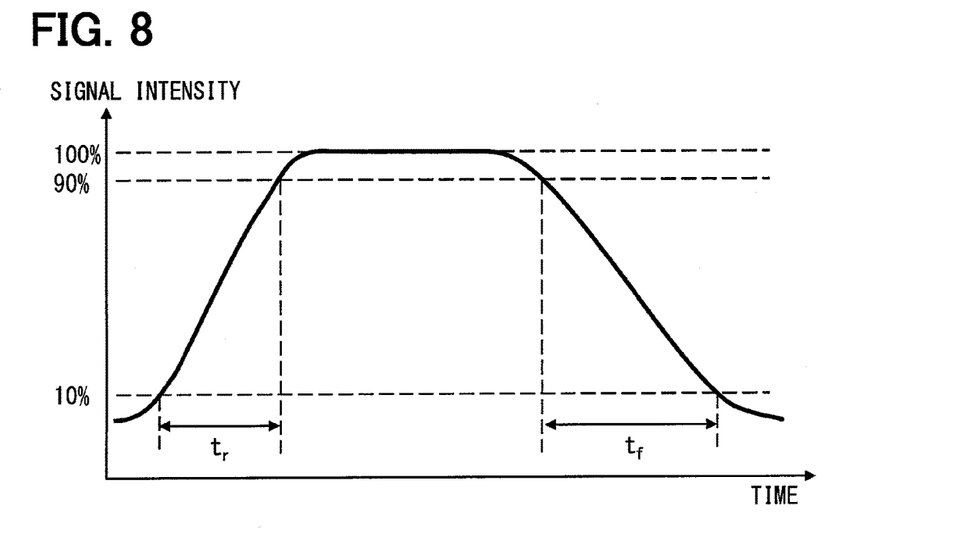
FIG. 8 is an illustration of an example of the degree of acuteness of a reflected wave.

When determination of Step S50 is YES, Step S53 is performed. In Step S53, the degree of acuteness of the form of the reflected wave is calculated. The degree of acuteness of the wave form is an index of to what degree the reflected wave is shaped in a pointing manner, and is, for example, a rising time tr or a falling time tf. As shown in FIG. 8, the rising time tr is time of rising from 10% of the maximum signal intensity to 90% of the maximum signal intensity, and the falling time tf is time of falling from 90% to 10% of the maximum.

The degree of acuteness may also be represented by other values, such as time to the falling of the signal intensity down to 10% after the rising thereof surpassing 10% of the maximum, or an average of the rising time tr and the falling time tf. Further, the slope of the wave form during the rising time tr or the slope of the wave form during the falling time tf may also be used as the degree of acuteness.

Then, in Step S54, it is determined whether the degree of acuteness calculated in Step S53 is smaller than an acuteness degree threshold THp set up in advance. In case that the irradiated light is reflected on the slope, an upper edge of the irradiated light and a lower edge of the irradiated light have respectively different travel lengths to the road surface. Further, the same applies to the reflected light in terms of traveling back lengths to the radar 20. When the travel lengths are different on both edges, the wave form of the reflected light is spread along the time axis than the irradiated light, which means that the reflected light has less acute, (i.e., a lower degree of acuteness).

Therefore, when the irradiated light reflects on the road surface of the slope, the wave form of the reflected light should have a lower degree of acuteness. In other words, when the degree of acuteness is high, the object that is reflecting the irradiated light is not a road surface, but a lead vehicle.

Therefore, when the degree of acuteness is smaller than the acuteness degree threshold THp (S54:YES), the process proceeds to Step S60, and the vehicle control stop mode comes into effect.

On the other hand, when the degree of acuteness is larger than the acuteness degree threshold THp (S54:NO), the process proceeds to Step S70, and the vehicle control execution mode comes into effect.

(Effect of the Third Embodiment)

As mentioned above, when the irradiated light reflects on the road surface of the slope, the wave form of the reflected light should have a lower degree of acuteness. Therefore, in the third embodiment, in addition to the inclination angle difference being larger than the inclination angle determination threshold THs (S50:YES), when the degree of acuteness is smaller than the acuteness degree threshold THp (S54:YES), the vehicle control stop mode is put in effect (S60).

On the other hand, if the degree of acuteness is larger than the acuteness degree threshold THp (S54:NO) even when the inclination angle difference is larger than the inclination angle determination threshold THs (S50:YES), the vehicle control execution mode is put in effect (S70).

Therefore, erroneous setting of the vehicle control stop mode into effect while the distance to the lead vehicle is being measured is prevented.

Fourth Embodiment

The process performed by the processor 50 in the fourth embodiment is also different from the one in the first embodiment.

Figure 9:
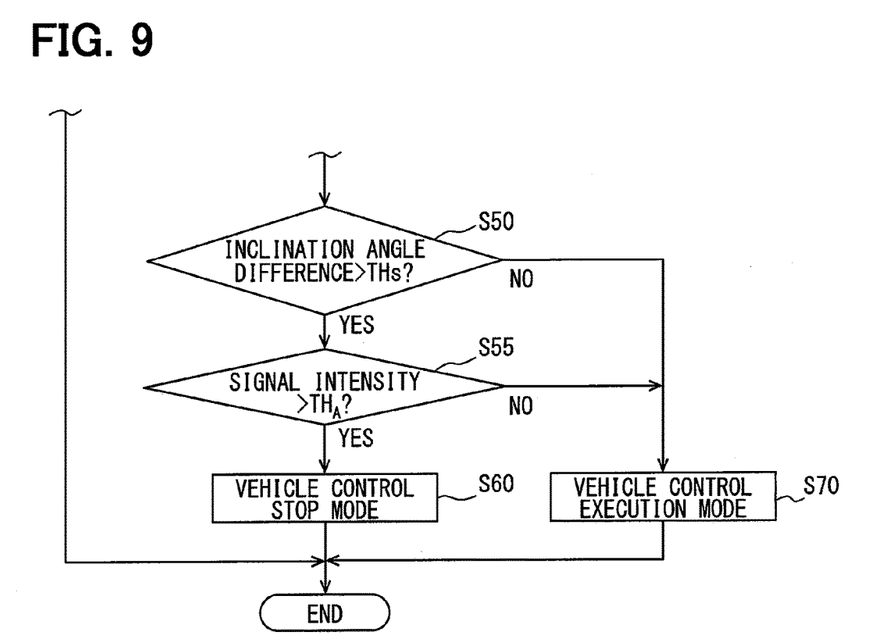
FIG. 9 is a flowchart partially replacing the flowchart in FIG. 2 in a fourth embodiment of the present disclosure.

According to the fourth embodiment, the process performed by the processor 50, which is shown in FIG. 2 in the first embodiment, is partially replaced with the process shown in FIG. 9.

In FIG. 9, the same part, i.e., Steps, as FIG. 2 is omitted. As for the process shown in FIG. 9, Step S55 is added to the process of FIG. 2, and the vehicle controller 54 performs Step S55.

When determination of Step S50 is YES, Step S55 is performed. In Step S55, it is determined whether the signal intensity of the reflected light is exceeding a control execution threshold $TH_A$ set up in advance. When this determination is YES, the process proceeds to Step S60, and when it is NO, the process proceeds to Step S70.

(Effect of the Fourth Embodiment)

According to the fourth embodiment, even when the inclination angle difference is larger than the inclination angle determination threshold THs (S50:YES), when the signal intensity of the reflected light is equal to or lower than the control execution threshold $TH_A$ (S55:NO), the vehicle control execution mode is put in effect (S70). The control execution threshold $TH_A$ sets a condition for the signal intensity for the calculation of the distance to the object. When the signal intensity of the reflected light is equal to or lower than the control execution threshold $TH_A$, the own vehicle will not automatically be decelerated even in the vehicle control execution mode.

Also, when the signal intensity is larger than the control execution threshold $TH_A$, which sets the vehicle control stop mode into effect, the own vehicle will not be decelerated automatically. Therefore, immediately after the determination in Step S55, the own vehicle will not automatically slow down regardless of the determination result in Step S55.

However, once the vehicle control stop mode is set "hastily", unless the inclination angle difference falls down to be equal to or lower than the inclination angle determination threshold THs, the vehicle control execution mode will not come into effect. Therefore, even though the distance to the lead vehicle is being measured (i.e., is detected), it may be possible that the automatic deceleration of the own vehicle is not performable due to the vehicle control stop mode.

According to the operation scheme of the fourth embodiment, however, the possibility of the voiding the automatic deceleration of the own vehicle in a lead vehicle distance available situation is reduced.

Fifth Embodiment

Figure 10:
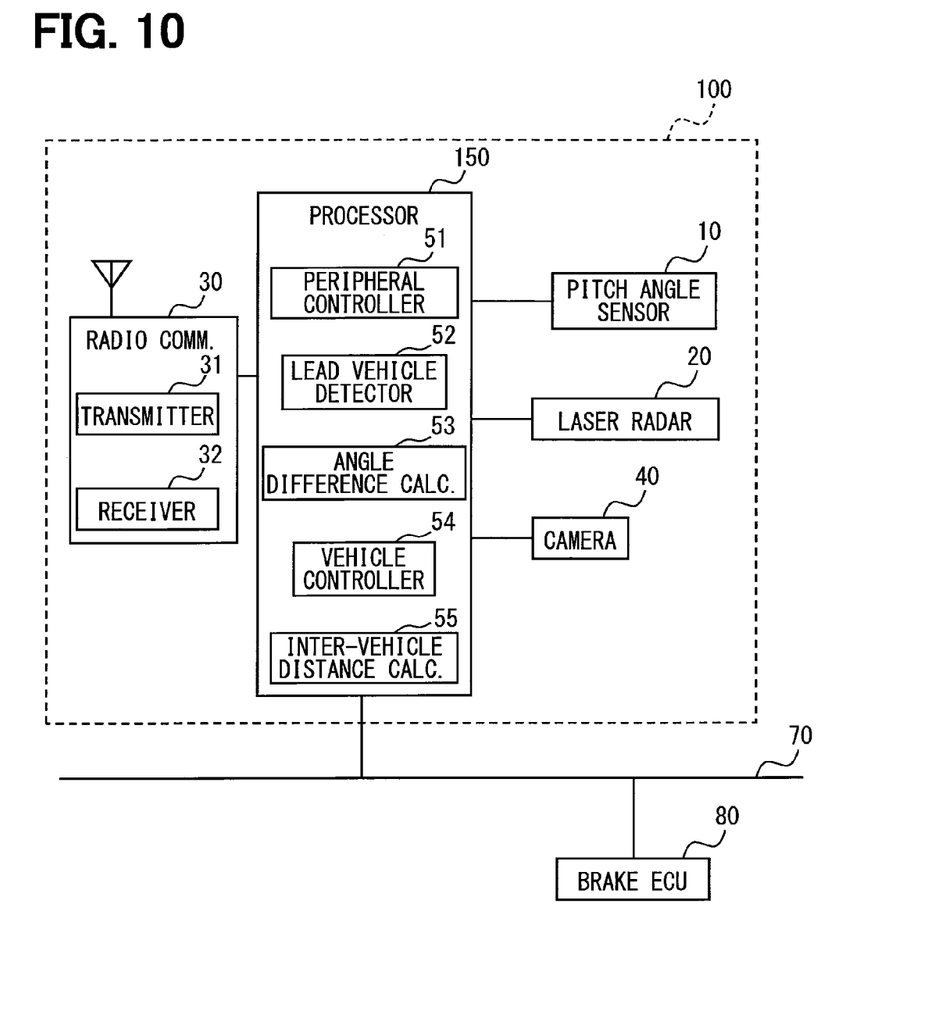
FIG. 10 is a block diagram of an in-vehicle system in a fifth embodiment of the present disclosure.

An in-vehicle system 100 of the fifth embodiment is further provided with a camera 40, as shown in FIG. 10. The viewing angle in the vertical direction of the camera 40 (i.e., the detection angle in the vertical direction) is larger than the scan angle range R in the vertical direction of the laser radar 20. The camera 40 is used as an image sensor for calculating an inter-vehicle distance to the lead vehicle, and corresponds to the second distance sensor. The camera 40 may be a stereo camera, or may be a single lens camera.

In addition to each of the units 51-54 described above, a processor 150 is provided with an inter-vehicle distance calculator 55. The inter-vehicle distance calculator 55 calculates a distance which is a weighted average of a distance D1 to the lead vehicle calculated by the laser radar 20 and a distance D2 to the lead vehicle calculated from an image captured by the camera 40 (henceforth, a weighted average distance $D_{AV}$). The vehicle controller 54 performs the automatic brake control based on the weighted average distance $D_{AV}$.

The distance D1 to the lead vehicle calculated by the laser radar 20 corresponds to a first distance, and the distance D2 to the lead vehicle calculated from the image captured by the camera 40 corresponds to a second distance. In the fifth embodiment, the inter-vehicle distance calculator 55 corresponds to a processor.

The recognition method of recognizing the lead vehicle from the image captured by the camera 40 is publicly known (e.g., by using a pattern recognition method). When a single-lens camera is used to calculate a distance to the lead vehicle, for example, the size of a character on a license plate of the lead vehicle is measured in the camera captured image, and the distance to the lead vehicle is calculated based on the character size in the image, which is publicly known.

Figure 11:
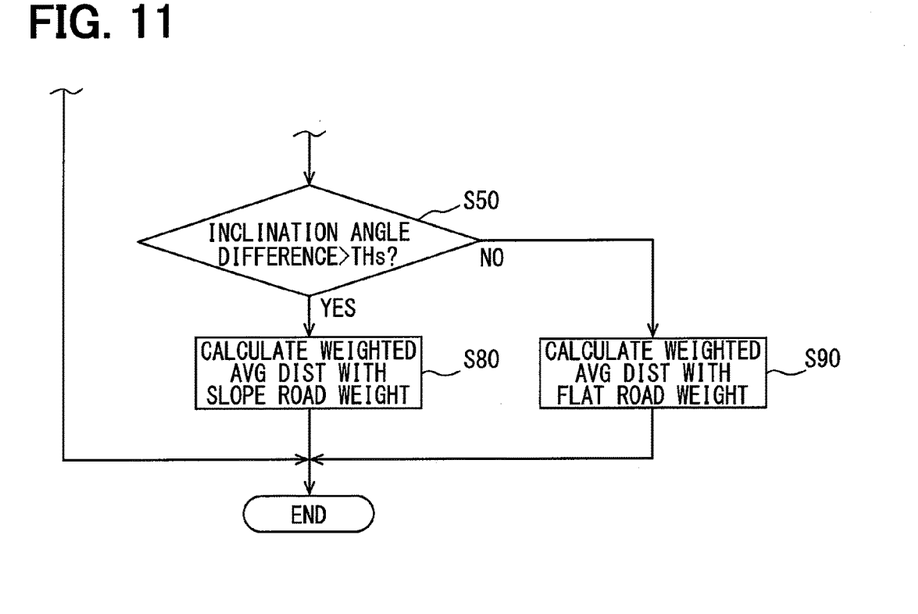
FIG. 11 is a flowchart partially replacing the flowchart in FIG. 2 in the fifth embodiment of the present disclosure.

According to the fifth embodiment, the process performed by the processor 50, which is shown in FIG. 2 in the first embodiment, is partially replaced with the process shown in FIG. 11.

In FIG. 11, the same part (i.e., Steps) as shown in FIG. 2 is omitted. As for the process shown in FIG. 11, Steps S80 and S90 are replaced with Steps S60 and S70 in the process of FIG. 2, and inter-vehicle distance calculator 55 performs Steps S80 and S90.

When it is determined that the inclination angle difference is equal to or smaller than the inclination angle determination threshold THs (S50:NO), the process proceeds to Step S90.

In Step S90, the weighted average distance $D_{AV}$ is calculated by using a flat road weight. The flat road weight weights the distance D1 calculated by the laser radar 20 heavily than a slope road weight which is described later.

For example, the flat road weight weights the distance D1 calculated by the laser radar 20 by 70, while weighting the distance D2 calculated from the image captured by the camera 40 by 30. The weighted average distance $D_{AV}$ by using the flat road weight is (D1×70+D2×30)/100. Step S90 is performed in the flat mode.

When it is determined that the inclination angle difference is larger than the inclination angle determination threshold THs (S50:YES), the process proceeds to Step S80.

In Step S80, the weighted average distance $D_{AV}$ is calculated by using the slope road weight. For example, the slope road weight weights the distance D1 calculated by the laser radar 20 by 20, while weighting the distance D2 calculated from the image captured by the camera 40 by 80. The weighted average distance $D_{AV}$ by using the slope road weight is (D1×20+D2×80)/100. Step S80 is performed in the inclination mode.

(Effect of the Fifth Embodiment)

According to this fifth embodiment, the camera 40 is used as a sensor for measuring a distance to the lead vehicle besides the laser radar 20, and the weighted average distance $D_{AV}$ of distances D1 and D2 is calculated.

In the fifth embodiment, when it is determined that the inclination angle difference is larger than the inclination angle determination threshold THs (S50:YES), the weighted average distance $D_{AV}$ is calculated by using the slope road weight, which weights the radar-20-calculated distance D1 lighter than the flat road weight. In such manner, even when the distance D1 which is calculated by the laser radar 20 is the distance to the road surface, the error of the weighted average distance $D_{AV}$ against the actual distance to the lead vehicle becomes small. Therefore, an erroneous vehicle control is prevented.

Further, the distance measured by the laser radar 20 is highly accurate. Therefore, when it is determined that the inclination angle difference is equal to or smaller than the inclination angle determination threshold THs (S50:NO), the accuracy of the weighted average distance $D_{AV}$ in case of smaller-than-threshold inclination angle difference (i.e., when the inclination angle difference is equal to or smaller than the inclination angle determination threshold THs) is improved by calculating the weighted average distance $D_{AV}$ by using the flat road weight.

As mentioned above, although the embodiment of the present disclosure is described, it is not limited to the above-mentioned embodiments (i.e., the following modifications should be considered to be pertaining). Further, as long as the modifications are covered by the gist of the disclosure, other modifications may also pertain.

Modification 1

For example, the lead vehicle may be identified not based on the vehicle speed of the lead vehicle, but based on the current position of the lead vehicle. In such case, the in-vehicle system has a position detector, and the current position which is detected by the position detector is included in the transmitting vehicle information. The position detector may have, for example, a Global Positioning System (GPS) receiver.

The lead vehicle detector 52 identifies the transmitting vehicle information transmitted from the lead vehicle based on a comparison between two relative positions (i.e., (i) a first position calculable from the current position of the own vehicle and the current position included in the transmitting vehicle information that is received by the receiver 32 of the radio communicator 30 and (ii) a second position detected by the laser radar 20).

Modification 2

Although the in-vehicle system 1 is disposed in two or more vehicles in the above-mentioned embodiments, the configuration may not be limited to such one. That is, the own vehicle does not have to have the transmitter 31.

Further, the lead vehicle does not have to have all of the pitch angle sensor 10, the transmitter 31, and the peripheral controller 51. That is, the lead vehicle needs to have an inclination angle transmission function only.

Modification 3

According to the above-mentioned embodiment, the laser radar 20 is described as an electro-magnetic wave distance sensor. However, the electric wave distance sensor (e.g. the millimeter wave radar) may also be usable as the electro-magnetic wave type distance sensor.

In the electric wave distance sensor, the transmission wave is an electric wave, and the electric wave is reflected by the object to be received as the reflected wave.

Modification 4

According to the fifth embodiment, the camera 40 is described as the second distance sensor. However, the straight-transmission stability of the electric wave is not as high as the light beam. Therefore, the electric wave type radar such as the millimeter wave radar or the like may be used as the second distance sensor.

Although the present disclosure has been described in connection with preferred embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An in-vehicle apparatus installed in a first vehicle, the apparatus comprising:
    a first distance sensor configured to measure a distance to an object based on time to receive a reflection wave of an electro-magnetic transmission wave from the object after a transmission of the electro-magnetic transmission wave, the first distance sensor being an electro-magnetic wave sensor;
    a pitch angle sensor configured to sense a first vehicle inclination angle representative of a pitch angle of the first vehicle that includes the first distance sensor;
    a radio communicator configured to receive a second vehicle inclination angle transmitted from a second vehicle that leads the first vehicle;
    an angle difference calculator configured to calculate an angle difference between the first vehicle inclination angle and the second vehicle inclination angle; and
    a processor configured to perform a preset operation based on the distance measured by the first distance sensor, wherein
    when the angle difference calculator indicates the angle difference is greater than a preset threshold, the processor operates in an inclination mode, and wherein
    when the angle difference calculator indicates the angle difference is less than the preset threshold, the processor operates in a flat mode, and wherein
    a vehicle control performed by the processor based on the distance measured by the first distance sensor is per- 2. The in-vehicle apparatus of claim 1, wherein
the processor operates in the inclination mode when (i) the angle difference calculated by the angle difference calculator is greater than the preset threshold, and (ii) the object reflecting the electro-magnetic transmission wave is determined as stationary based on a change of the distance measured by the first distance sensor.

3. The in-vehicle apparatus of claim 1, wherein
the first distance sensor transmits the transmission wave in a pulse form, and
the processor operates in the inclination mode when (i) the angle difference calculated by the angle difference calculator is greater than the preset threshold, and (ii) a degree of acuteness of a wave form of the reflection wave of the transmission wave received by the first distance sensor is smaller than an acuteness threshold.

4. The in-vehicle apparatus of claim 1, wherein
the processor operates in the inclination mode when (i) the angle difference calculated by the angle difference calculator is greater than the preset threshold, and (ii) a signal intensity of the reflection wave of the transmission wave is exceeding a preset control execution threshold.

5. The in-vehicle apparatus of claim 1, wherein
the processor performs, as the preset operation, an arithmetic operation for executing the vehicle control based on the distance measured by the first distance sensor, and
the inclination mode aborts the vehicle control.

6. The in-vehicle apparatus of claim 1 further comprising:
a second distance sensor having a wider vertical detection angle than the first distance sensor, wherein
the processor calculates a weighted average of a first distance measured by the first distance sensor and a second distance measured by the second distance sensor, and
a weighted average of the first distance in the inclination mode is smaller than a weighted average of the first distance in the flat mode.

7. An in-vehicle system comprising:
an in-vehicle apparatus installed in a first vehicle, the apparatus comprising:
an electro-magnetic wave sensor configured to measure a distance to an object based on time to receive a reflection wave of an electro-magnetic transmission wave from the object after a transmission of the electro-magnetic transmission wave;
a pitch angle sensor configured to sense a first vehicle inclination angle representative of a pitch angle of the first vehicle that includes the electro-magnetic wave sensor;
a radio communicator configured to receive a second vehicle inclination angle transmitted from a second vehicle that leads the first vehicle;
an angle difference calculator configured to calculate an angle difference between the first vehicle inclination angle and the second vehicle inclination angle; and
a processor configured to perform a preset operation based on the distance measured by the electro-magnetic wave sensor, wherein
when the angle difference calculator indicates the angle difference is greater than a preset threshold, the processor operates in an inclination mode, and wherein
when the angle difference calculator indicates the angle difference is less than the preset threshold, the processor operates in a flat mode, and wherein
a vehicle control performed by the processor based on the distance measured by the first distance sensor is performed less when the processor operates in the inclination mode than when the processor operates in the flat mode.

8. The in-vehicle system of claim 7, wherein
the radio communicator includes:
a receiver configured to receive the second vehicle inclination angle; and
a transmitter transmitting configured to transmit the first vehicle inclination angle sensed by the pitch angle sensor.

* * * * *